United States Patent [19]
Walton

[11] Patent Number: 5,184,943
[45] Date of Patent: Feb. 9, 1993

[54] ROLLING DIAPHRAGM INJECTION PUMP

[75] Inventor: Frank Walton, Argyle, Tex.

[73] Assignee: Frank and Robyn Walton 1990 Family Trust, Lewisville, Tex.

[21] Appl. No.: 666,583

[22] Filed: Mar. 8, 1991

[51] Int. Cl.$^5$ .................................................. F04B 17/00
[52] U.S. Cl. ....................................... 417/401; 417/377; 417/511
[58] Field of Search ................ 417/401, 403, 480, 511, 417/514, 377, 375

[56] References Cited

U.S. PATENT DOCUMENTS

| | | | |
|---|---|---|---|
| Re. 29,193 | 4/1977 | Carlyle | 137/99 |
| 1,506,834 | 9/1924 | Hook | 251/75 |
| 1,674,614 | 6/1928 | Berkman | 417/403 |
| 1,859,834 | 5/1932 | May | 251/273 |
| 1,887,836 | 11/1932 | Faber | 137/596 |
| 2,044,044 | 6/1936 | Anthony | 103/38 |
| 2,262,031 | 11/1941 | Meyer | 137/99 |
| 2,278,395 | 3/1941 | Lichte et al. | 103/41 |
| 2,712,427 | 7/1955 | Welborn et al. | 251/61 |
| 2,750,930 | 6/1956 | Baur et al. | 121/164 |
| 3,136,256 | 6/1964 | Chenault | 103/46 |
| 3,213,873 | 10/1965 | Cordis | 137/99 |
| 3,356,335 | 12/1967 | Koch et al. | 251/214 |
| 3,405,606 | 5/1972 | Scheffer | 91/306 |
| 3,665,808 | 5/1972 | Vestal | 91/272 |
| 3,680,985 | 8/1972 | Ginsberg et al. | 417/502 |
| 3,692,274 | 9/1972 | Rosen et al. | 251/75 |
| 3,753,528 | 8/1973 | Gibbs | 239/61 |
| 3,880,055 | 4/1975 | Nakamura et al. | 92/1170 |
| 3,887,305 | 6/1975 | Ito | 417/554 |
| 3,901,313 | 8/1975 | Doniguian et al. | 166/64 |
| 3,937,241 | 2/1976 | Cloup | 137/99 |
| 4,060,351 | 11/1977 | Cloup | 417/520 |
| 4,166,607 | 9/1979 | Webb | 251/335 B |
| 4,424,005 | 1/1984 | Manning | 417/53 |
| 4,558,715 | 12/1985 | Walton et al. | 137/99 |
| 4,662,831 | 5/1987 | Bennett | 417/430 |
| 4,756,329 | 7/1988 | Cloup | 137/99 |
| 4,773,305 | 9/1988 | Nissels | 92/98 |
| 4,809,731 | 3/1989 | Walton et al. | 137/99 |

FOREIGN PATENT DOCUMENTS

| | | |
|---|---|---|
| 1266181 | 2/1990 | Canada . |
| 0161614 | 11/1985 | European Pat. Off. . |
| 0251948 | 6/1987 | European Pat. Off. ............ 417/554 |
| 475391 | 11/1937 | United Kingdom . |
| 595458 | 12/1947 | United Kingdom . |
| 2068475 | 8/1981 | United Kingdom . |

Primary Examiner—Richard A. Bertsch
Assistant Examiner—Charles G. Freay
Attorney, Agent, or Firm—Hubbard, Thurman, Tucker & Harris

[57] ABSTRACT

An additive injection pump has a rolling diaphragm mounted between a reciprocable assembly and a cylinder to create a secondary fluid pumping chamber in the lower end of the cylinder. The reciprocable assembly has an internal one-way flow passage between the pumping chamber and an opposite end portion of the assembly having an outlet. The selective positioning of a valve member at the bottom of the reciprocable assembly establishes a predetermined quantity of secondary fluid supplied through an inlet at the bottom of the cylinder. When the cylinder is attached to a housing having a primary fluid stream and the assembly is reciprocated by a fluid motor in the housing, secondary fluid in predetermined doses is injected into the primary fluid stream.

29 Claims, 3 Drawing Sheets

ROLLING DIAPHRAGM INJECTION PUMP

FIELD OF THE INVENTION

The invention pertains to a pumping apparatus for injecting predetermined quantities of secondary fluid additive into a primary fluid stream.

BACKGROUND

Several devices have been developed for injecting predetermined quantities of liquid additives into a primary liquid stream for such applications as adding medication to drinking water for livestock, treating water with additives such as halogens, or adding fertilizer concentrate to irrigation water, for example. In known devices, energy supplied to the pumping mechanism originates from the flow of the primary fluid under pressure in an enclosure containing a stepped differential piston. A mechanism with valves carried by the piston enables the fluid pressure to be applied to either face of the stepped piston, which thus describes a reciprocating motion and which forms the driving member for a metering piston interacting with a cylinder in communication with a storage vessel of the product to be injected. Such devices are found in my own U.S. Pat. Nos. 4,558,715 and 4,809,731, as well as U.S. Pat. No. 4,756,329 to Jean Cloup.

It is to be understood that although the additive secondary fluid to be injected into the main stream by an injection pump is usually a relatively small volume compared to the main fluid volume, the additive fluid may not be a true solution, but rather a dispersion solution which contains abrasive particles. This may be a result of chemical precipitation upon contact with the primary fluid because of temperature changes and chemical conditions. Accretion of hard precipitate can occur on surfaces and parts simply by passing ordinary tap water thereover after an extended period of time.

Some of the injection devices, such as my U.S. Pat. No. 4,558,715, may have a seal through which the injection pump piston rod reciprocates in order to direct the additive fluid to the outlet side of a reciprocating motor. Others, such as U.S. Pat. No. 4,756,329, have an injection pump with a metering piston which slides in a tube or liner which is exposed to the secondary additive fluid. The prior art injection pumps are thus subject to wear which destroys their ability to pump and to draw secondary fluid into the piston cylinder chamber. Wear may also destroy seals intended to separate the primary and secondary fluids which may cause the primary fluid to dilute the secondary fluid in the additive pump and result in imprecise metering. It would be desirable to eliminate sliding surfaces which wear and leak.

SUMMARY OF THE INVENTION

A rolling diaphragm pump is provided which completely eliminates sliding seal surfaces which can cause wear or leakage. The improved pump is contained in a cylinder which may be attached to the bottom of a housing containing the primary fluid and a reciprocating motor. The injection pump is connected through an opening in the housing without a sliding seal. A source of secondary fluid to be injected into the primary fluid is connected at the opposite end of the cylinder.

The injection pump cylinder has a first end adapted for connecting to a housing having a pressurized primary fluid flow and a reciprocating motor therein, the cylinder having a bore and an opposite second end closed by a cap member having a secondary fluid inlet connectable to a secondary fluid reservoir. A reciprocable assembly having an outlet at a first end portion and an inlet at a second end portion has an internal passage means between the first and second end portions for transmitting secondary fluid from the inlet to the outlet. The reciprocable assembly is positioned for reciprocation in the bore with the second end portion of the reciprocable assembly having a valve means for opening and closing the secondary fluid inlet of the second end of the cylinder. When the cylinder is attached to the motor housing, the reciprocable assembly has a hollow stem forming part of the passage means which extends from the open end of the cylinder into the housing for connection with a stepped piston motor of prior art design in the housing. The stepped piston motor operates under pressurized flow of the primary fluid. It is connected to the stem to operate the reciprocable assembly. There is no sliding seal between the stem and the housing.

A rolling diaphragm sealingly connects the cylinder and the reciprocating assembly to form a secondary fluid chamber in the bore of the injection cylinder which is variable in volume according to the position of the reciprocable assembly between an upstroke away from the closed end of the injection cylinder and a downstroke towards the closed end of the injection cylinder. On the upstroke, a vacuum is created in the secondary fluid chamber by the raising of the diaphragm. The valve means opens to admit secondary fluid from the secondary fluid reservoir into the secondary fluid chamber below the diaphragm.

During the downstroke, the secondary fluid in the chamber is compressed after the valve means closes the secondary fluid inlet to force secondary fluid into the inlet of the reciprocable assembly, through the internal passageway and out of the outlet where it mixes with the primary fluid in the housing. A predetermined quantity of secondary fluid is thus injected on each reciprocation, and the amount of that predetermined quantity will depend upon when the valve means contacts and closes the secondary fluid inlet during the downstroke. If the valve means closes soon then a larger quantity will be injected, but if the valve means does not close until almost the full downstroke, then any fluid in the chamber will simply be forced back into the secondary fluid reservoir until the valve means closes the secondary fluid inlet, whereupon compression takes effect to inject secondary fluid through the passageway.

The second end portion of the reciprocable assembly includes a means for positioning the valve means to close the secondary fluid inlet during a portion of the downstroke. The positioning means is preferably a selective positioning means, including a lost motion coupling where one part of the second end portion moves relative to another part by means of a pin in one part and a cooperating slot in the other part. An elongated hollow shaft containing a portion of the internal passage is slidingly fitted into the inside of a hollow sleeve wherein the pin may be placed at different distances along the longitudinal axis of the shaft so that when the reciprocable assembly is raised, the shaft will slide part way out of the hollow sleeve until the pin is caught in the cooperating slot. Since the valve means is connected to the lower end of the slidable shaft, its distance from the diaphragm is variable depending on where the pin is set. Thus, the valve means seals the inlet and allows the diaphragm to compress the fluid sooner or later during the downstroke of the reciprocating cycle. The selective positioning means thus allows the operator to select a predetermined quantity of secondary fluid to be injected on each cycle.

There is provided a fluid additive injection pump with a rolling diaphragm which when connected to a housing and a reciprocating motor therein, injects a predetermined quantity of secondary fluid reliably and economically into the primary fluid without the problems caused by sliding seals. Those skilled in the art will further appreciate the above-described features and advantages of the invention as well as the additional superior aspects upon reading the detailed description which follows in conjunction with the drawing.

DESCRIPTION OF THE PREFERRED EMBODIMENT

Figures 1, 3, 4, 5:
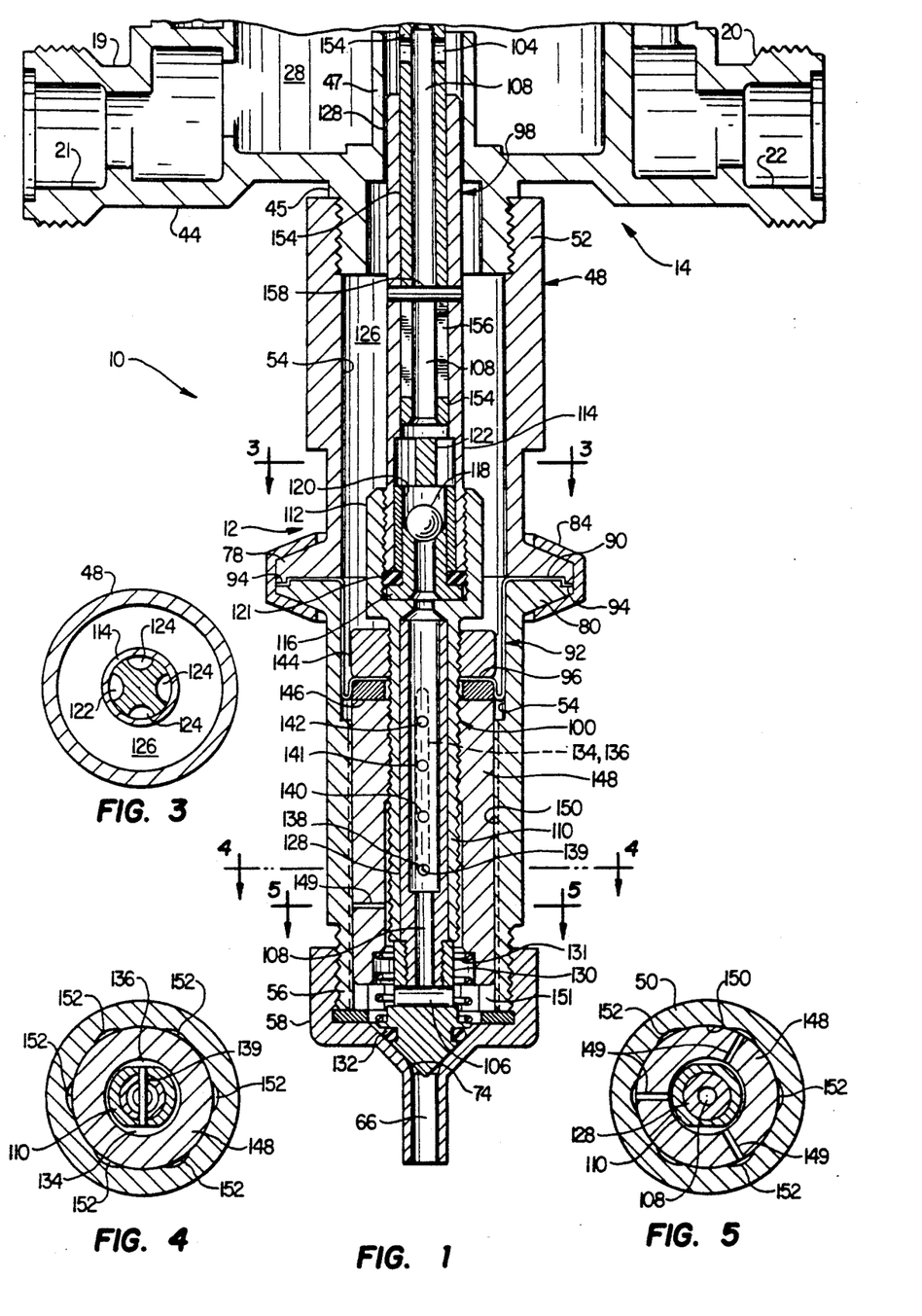
FIG. 1 has a longitudinal central section view of the additive injection pump apparatus.
FIG. 3 is a detailed section taken along the line 3—3 of FIG. 1.
FIG. 4 is a section view taken along the line 4—4 of FIG. 1.
FIG. 5 is a section view taken along the line 5—5 of FIG. 1.
Figure 2:
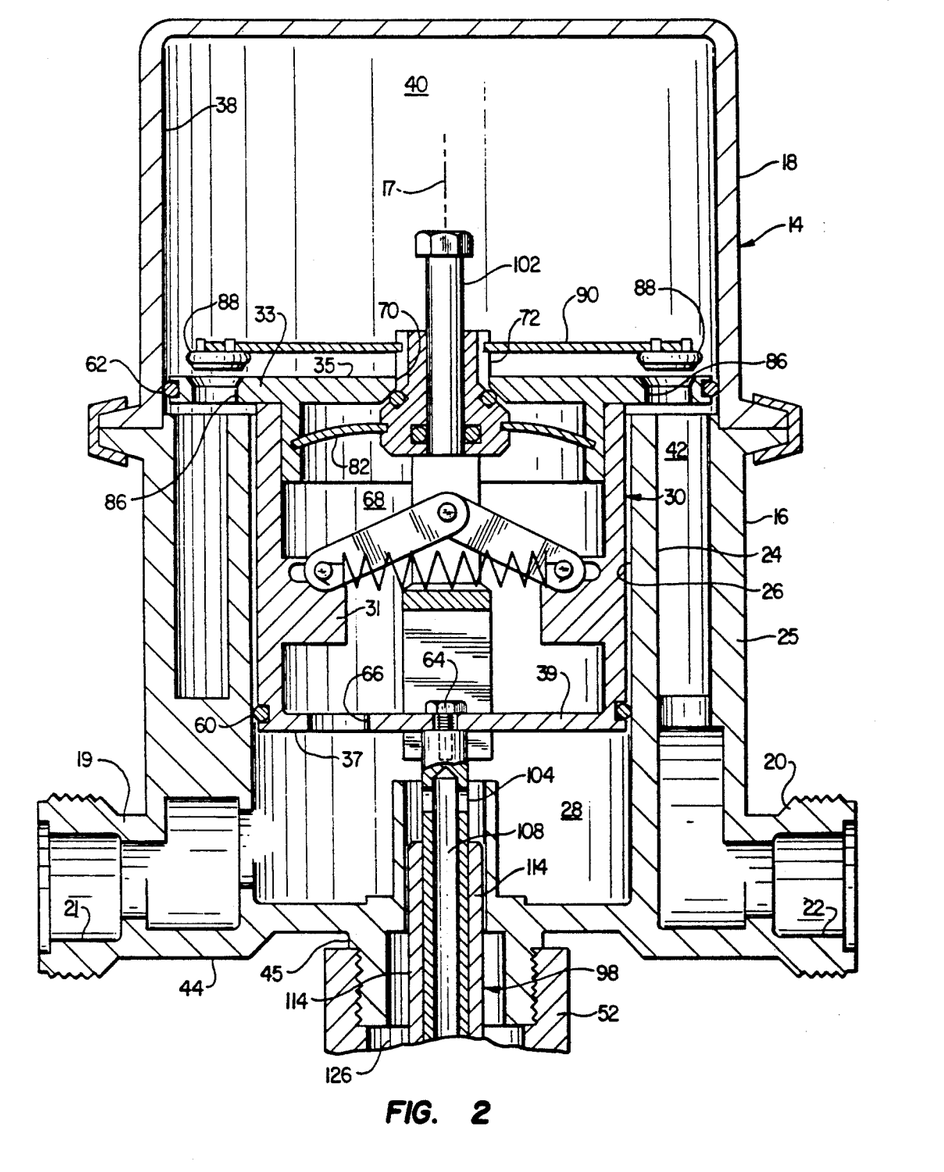
FIG. 2 is a longitudinal central section of a slightly modified prior art housing and reciprocating motor showing a stepped piston connected to the reciprocable assembly.

In FIG. 1, a liquid additive injection pump apparatus is generally designated by the reference numeral 10. The pump apparatus is contained in a cylinder generally designated by the reference numeral 12 having a upper half 48 and a lower half 50. Upper half 48 has an upper end portion 52 which is threaded onto a threaded boss 45 centered on the bottom wall 44 of a housing containing a primary fluid and a reciprocal motor of prior art design best seen in FIG. 2. The housing and reciprocable stepped piston motor seen in FIG. 2 is from my U.S. Pat. Nos. 4,558,715 and 4,809,731 and the description thereof is incorporated herein by reference.

In brief, the housing 14 has a lower section 16 and an upper section 18. The housing section 16 includes opposed bosses 19 and 20 providing respective fluid inlet and discharge passages 21 and 22. The bosses 19 and 20 are adapted to be connected to conduit, not shown, for conducting a primary liquid flow stream, such as water, into which a fluid additive is to be injected, where it is mixed and carried by the fluid to the outlet passage 22.

Housing 16 includes an interior cylindrical wall part 24 delimited by a cylindrical bore 26 forming a first expansible chamber 28 for a reciprocal piston assembly 30. Housing 18 is releasably clamped to housing 16 across cooperating circumferential flanges. Housing 18 includes a bore 38 cooperable with piston assembly 30 forming second expansible chamber 40. Housing section 16 further includes a third expansible fluid discharge chamber 42 which is defined in part between the wall part 24 and an outer cylindrical side wall 25. The chamber 42 is in communication with the fluid discharge passage 22 and the chamber 28 is in communication with the fluid inlet passage 21. Housing section 16 further includes a bottom wall portion 44 integrally formed with the side wall 25 and having a threaded boss 45 extending therefrom centered on the longitudinal axis 17. Bottom wall 44 also has an inner cylindrical boss 47 which opens to the primary chamber fluid 28.

Piston assembly 30 includes a first piston part 31 reciprocably disposed in the bore 26 in sealing engagement therewith by a piston ring seal 60. A second piston part 33 of larger diameter than piston part 31 and suitably secured thereto is slidably disposed in chamber 40. Piston part 33 as in slidable sealing engagement with bore 38 by piston ring seal 62. The axially projected area of piston face 35 with respect to the longitudinal central axis 17 is greater than the opposed axially projected area of piston face 37 which is exposed to chamber 28. A bottom wall 39 is suitably connected by a fastener 64 to the upper most part of a reciprocable pump assembly shown in FIG. 1.

Bottom wall 39 includes an opening 66 which communicates that chamber 28 with an interior chamber portion 68 of the first chamber 28 formed within the piston assembly 33. Piston part 33 includes a central bore 70 which is cooperable with a movable valve closure member 72 to effectively block the flow of fluid between chambers 28 and 40. Closure member 72 is adapted to be biased to an open or closed position of the central bore 70 by a leaf spring 82.

Piston part 33 includes at least two fluid discharge valve passages 86 formed near the outer periphery of the part 33 in communication with chamber 42. Poppet type valve closure members 88 are disposed for closing the passages 86 and are supported on arms 90. Accordingly, when closure member 72 moves to a position to place the chambers 28 and 40 in communication with each other, valve closure members 88 move to block the flow of fluid between chambers 40 and 42. Central shaft 102 is connected to a snap-over center mechanism internal of the stepped piston assembly 30 to open and close the valves which operate the piston. It can be seen that the stepped piston and housing provides a reciprocable motor which operates as described in my U.S. Pat. Nos. 4,558,715 and 4,809,731.

Referring to FIG. 1, the upper and lower halves 48, 50 of the cylinder 12 have an internal bore 54. The first or upper end 52 is adapted to be connected to the housing boss 45 in a fluid tight connection. The lower half 50 has a second or lower end 56 which is closed by a head member 58 except for having a secondary fluid inlet 66 connectable to a source of secondary fluid. Head member 58 has a tapered valve seat 74 for a valve member. A sealing ring 76 seals head member 56 against the bottom end portion 56 of the cylinder 12.

Intermediate the first and second ends 52,56 of the cylinder 12 are mating cylindrical flanges 78 of upper half 48 and 80 of lower half 50. The flanges 78,80 are sealingly and removably held together by a clamp 84. The outer rim portion 90 of rolling diaphragm 92 is sealingly engaged and removably clamped between the flanges 78,80 held by the collar member 94. An annular ridge 94 may aid in sealingly engaging the outer rim portion of the rolling diaphragm. The rolling diaphragm also has an inner rim portion 96 sealingly held by a reciprocable assembly centered within the cylinder bore.

The reciprocable assembly has a first end portion 98 and an opposite second end portion 100 extended respectively within the upper and lower halves 48,50 of the cylinder. The first end portion 98 has an outlet 104.

The second end portion has an inlet 106. There is an internal passage means 108 extending between the inlet 106 and the outlet 104 for transmitting secondary fluid from the inlet 106 to the outlet 104, which is stationed in contact with primary fluid internally of the housing. The upper end portion 98 of the reciprocable assembly extends centrally through the lower boss 45 and the internal cylindrical boss 47 wherein secondary fluid eminating from outlet 104 is introduced into the primary fluid in chamber 28 of housing 14. First end portion 98 is connected to the bottom of the reciprocable piston by a fastener 64, as best seen in FIG. 2.

Rolling diaphragm 92 sealingly connects the cylinder and reciprocable assembly to form a secondary fluid chamber 151 in the bore below the diaphragm. Since inner rim portion 96 of the rolling diaphragm is connected to the reciprocable assembly, it is movable between an upstroke away from the closed end of the cylinder 12 and a downstroke toward the closed end of the cylinder, wherein secondary fluid is drawn into the volume below the diaphragm through the secondary fluid inlet during the upstroke and compressed below the diaphragm after the valve means closes the secondary fluid inlet during the downstroke. Positioning means on the second end portion of the reciprocable assembly positions the valve means to close the secondary fluid inlet during a portion of the downstroke, the positioning means being preferably selective.

Second end portion 100 includes an elongated hollow sleeve 110 having an enlarged head portion 112. Head portion 112 threadingly engages the lower end of a sleeve 114 which is part of the first end portion 98 of the reciprocable assembly. Mounted in head portion 112 is a one-way flow valve comprising a flanged seat 116 and ball 118 resting thereon. The one-way flow valve permits secondary fluid to transverse the opening 108 from inlet 106 to outlet 104. Threaded insert 120 holds the valve member in place. A seal 121 is placed between the flanges of valve seat 116 and insert 120. Best seen FIG. 3, a cross shaped stop 122 above ball 118 serves to keep the ball in place while secondary fluid is flowing upwardly through passage 108. Longitudinal channels 124 form a continuing part of passage 108. Upper chamber 126 surrounds sleeve 114 above the diaphragm, but chamber 126 is isolated from passage 108. Where the upper portion of sleeve 114 passes through the housing there is a gap 128 which permits communication between chamber 126 and chamber 28 whereby primary fluid from the housing can move back and forth between chambers 28 and 126 during reciprocation of the diaphragm. It is noted, however, there is no sliding seal where the reciprocable assembly passes through the wall of the housing.

Slidingly fitted within the interior of sleeve 110 is the elongated hollow shaft 128 containing a portion of passage 108. The lower end of shaft 128 threadingly engages the stem of a cone shaped valve member 130 having the secondary fluid inlet 106. Valve member 130 has a annular seal 132 which engages seat 74 of the secondary fluid inlet and is biased toward a closing position by a compression spring 131 captured by valve member 130 and the end of an elongated collar 148 which surrounds sleeve 110.

Figure 6:
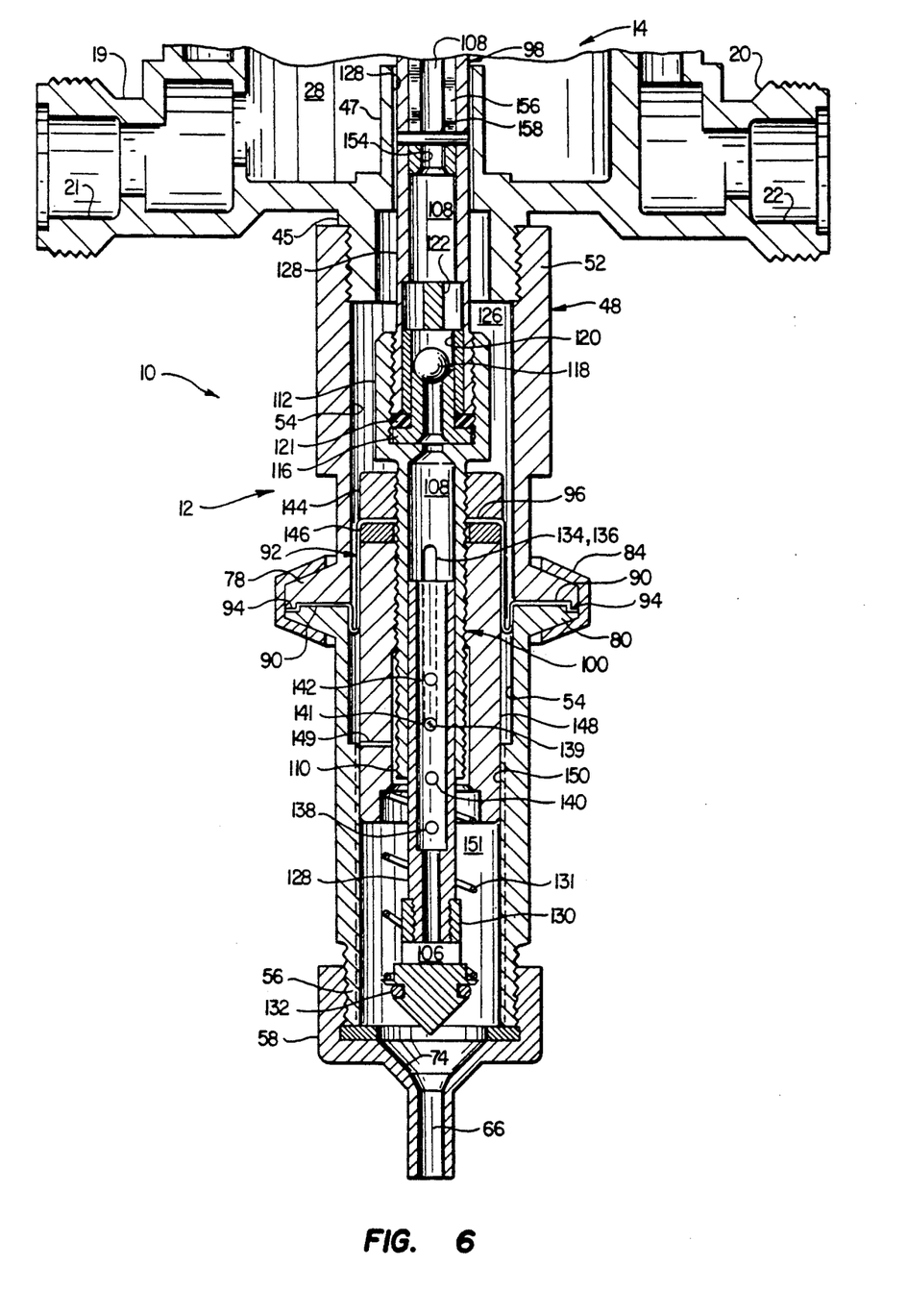
FIG. 6 is a view of the assembly of FIG. 1 in a raised position with the pin for the valve positioning means in a higher opening.

Sleeve 110 has a pair of elongated slots 134, 136 which are centrally located as indicated in FIG. 4. A pin 138 is placed in opening 139 of hollow shaft 128. It can be seen that whenever the sleeve 110 has reciprocated up with the rest of the reciprocable assembly, pin 138 will find the bottom of slot 134, 136 and then hollow shaft 128 and valve member 130 will rise with the rest of the reciprocable assembly. Hollow shaft 128 preferably also contains a plurality of alternate openings 140, 141 and 142 spaced therealong to receive the pin 138 in a different location. It can be seen that putting the pin member in a different opening farther from the valve member will have the effect of delaying the opening of the valve member 130 when the assembly moves up and closing the valve sooner on the downstroke. This is seen in FIG. 6 where the reciprocable assembly has been moved up. It should also be noted that the slidable parts, shaft 128 and sleeve 110 could have the pin openings and slots exchanged to provide the same selective action. That is, pin openings could be spaced along the sleeve and the slots could be in the shaft inside the sleeve.

The outer surface of sleeve 110 is threaded. Just below head portion 112, collar member 144 is threaded onto sleeve 110. The inner rim portion 96 of the rolling diaphragm is clamped between collar 144 and mating elongated collar 148 which are secured against annular seal 146 to sealingly hold the inner rim portion of the diaphragm. Elongated collar 148 is cylindrical in shape and closely fitted within the smaller diameter lower bore 150 in the lower half 50 of the cylinder. A plurality of longitudinal elongated channels 152 seen in FIGS. 4 and 5 provide for a fluid communication along the side wall of the elongated collar 148 extending between the valve member and the rolling diaphragm.

The elongated channels are shown spaced around the bore 150 which is a smaller diameter continuation of bore 54 and serves as a contact surface to guide and center elongated collar 148 during reciprocation. The channels could equally well be in collar 148 instead of bore wall 150. FIG. 5 also shows a triality of radial ports 149 through extended collar 148 in communication with ones of the longitudinal channels 152 and an interior space between the lower portion of the collar 148 and shaft 128. These ports help equalize fluid pressure and prevent the elongated collar from acting like a piston.

The first end portion 98 of the reciprocal assembly includes a connecting means comprising a lost motion coupling for accommodating the stroke of the reciprocable assembly with that of a reciprocable motor in the housing to which it is connected, which has a different stroke. Slidingly mounted within sleeve 114 is a hollow stem 154 which has slots 156 for a pin 158. Pin 158 is driven into openings through sleeve 114 in a friction fit. When the piston in housing 14 moves upwardly it raises stem 154 until the bottom of slots 156 engage pin 158. After pin 158 is engaged by the bottom of slots 156, further upward movement of stem 154 raises sleeve 114 and through its connection with head 112, raises sleeve 110 as well. On the downstroke the reciprocating motor in the housing moves the stem 154 downwardly until the pin 158 engages the upper portion of the slot, as is the position in FIG. 1, whereupon further downward motion moves sleeve 114 down and through its connection with head 112, moves sleeve 110 down as well.

FIG. 1 shows the rolling diaphragm with only a small distance to go before bottom dead center. The position of pin 138 in the bottom of the slot 134, 136 shows that the valve 130 has just closed the inlet 66. Prior to that time the inlet was open and fluid contained in the chamber below the diaphragm was expelled back into the secondary fluid reservoir. Now that valve 130 has closed, the continued downward motion (after the lost motion of pin 158 is accommodated by movement to the bottom of the slots 156), causes compression of the remaining secondary fluid in the chamber below the diaphragm and forces it into inlet 106 where it passes through the one-way check valve in passage 108 to exit into the primary fluid through secondary fluid outlet 104. It can be seen that only a small quantity of secondary fluid would be injected with this pin placement because the movement of the diaphragm after the valve member has closed the secondary fluid inlet is small. As the motor reciprocates upward from the position of FIG. 1 the reciprocable assembly immediately raises the valve member 130 from the seat 74 because the pin 138 quickly catches the bottom of the slot. It will be seen that a considerable travel of the valve member above the valve seat is thus permitted to draw a relatively large volume of secondary fluid into the chamber below the diaphragm. After the upstroke, the diaphragm forces most of that fluid back into the secondary fluid reservoir as previously mentioned until the valve member is closed.

If, however, the pin member 138 is placed in another position such as position 140,141 or 142 it can be seen that on the upstroke the hollow shaft 128 will extend much further out of the sleeve 110, and thus at the completion of the upstroke the valve member 130 will be extended downwardly and much closer to the inlet. When the downstroke takes place the valve member 130 will close much sooner thus blocking the exit of the secondary fluid. Since the diaphragm still has a considerable distance of travel before bottom dead center, a much larger quantity of secondary fluid will be forced into inlet 106, through passage 108 and out secondary fluid outlet 104 into the chamber 28.

In FIG. 6 is illustrated the injection pump of FIG. 1 except that pin 138 in FIG. 6 has been placed in a different opening 141 of hollow shaft 128. The reciprocable assembly has been moved up to near a top dead center position and as a result of the pin placement, shaft 128 which carries valve 130 has been extended by gravity aided by the bias of the spring. Because the pump stroke is uniform, a different predetermined volume of secondary fluid will be trapped in the chamber below the diaphragm on the downstroke when the valve member 130 closes the secondary fluid inlet. Moving the pin 138 to a higher opening in shaft 128 would create a still higher predetermined volume to be injected after the valve member 130 closes. It will be noted that extended collar 148 surrounding shaft 128 rides on the smaller lower bore 150 during reciprocation and serves as a guide member to keep it centered for reciprocation in the cylinder. Its annular surface provides support for the rolling diaphragm and is smaller than the bore 54 to provide clearance for the rolling action of the diaphragm.

Selective positioning of pin member 138 thus controls a selective predetermined volume which is compressed and injected into the primary fluid of the housing. It will be especially noted that there are no sliding seals anywhere in the rolling diaphragm pump assembly which would be subject to wear and damage because of precipitation or the use of dispersion solutions as a secondary fluid. Such wear can result in loss of vacuum on the upstroke which causes pump failure. The fact that secondary fluid may be drawn from the chamber 28 into chamber 126 above the diaphragm causes no problem either because there is no sliding seal between the reciprocable parts which extend up through the central opening into the housing.

The rolling diaphragm is preferably rubber coated polyester cloth which is commercially available and sold under the trademark "BELLOFRAM". The diaphragm is identified as a class 4 of a standard design under "BELLOFRAM" part number 4-150-150-CBJ. The selected diaphragm is for a cylinder bore of 1.50 inches and a height of 1.5 inches with a side wall thickness identified as "C", said to be approximately 0.017 inches and effective pressure area of 1.5 inches and a maximum half stroke of 1.12 inches. The parts for the rolling diaphragm injection pump are expected to made from conventional engineering plastics of the type utilized for pumping various types of corrosive as well as non-corrosive liquids.

Although a preferred embodiment of the invention has been described herein in detail, those skilled in the art will recognize that various substitutions and modifications may be made without parting from the scope and spirit of the invention as recited in the appended claims.

What is claimed is:

1. A rolling diaphragm pump apparatus for supplying a predetermined quantity of secondary fluid to an outlet located in the primary fluid of a housing, comprising:
   a cylinder having opposite first and second ends and a bore between the ends, the first end being adapted for connection to a housing having a primary fluid and a reciprocating motor, the second end being closed except for having a fluid inlet connectable to a source of secondary fluid;
   a reciprocable assembly positioned for reciprocation in the bore without depending upon a sliding seal between the reciprocable assembly and the bore, the reciprocable assembly having an outlet in a first end portion and an inlet in an opposite second end portion and an internal passage means between said first and second end portions for transmitting secondary fluid from the inlet to the outlet, with the second end portion having a valve means for opening and closing the secondary fluid inlet at said second end of the cylinder;
   a rolling diaphragm sealingly connecting the cylinder and reciprocating assembly to form a secondary fluid chamber in the bore below and movable with the reciprocating assembly between an up stroke away from the closed end of the cylinder and a down stroke towards the closed end of the cylinder, to draw secondary fluid into the volume below the diaphragm through the secondary fluid into inlet during the up stroke and to compress the secondary fluid below the diaphragm after the valve means closes the secondary fluid inlet during the down stroke, to force secondary fluid into the inlet of the reciprocable assembly, through the internal passage and outlet whereby a predetermined quantity of secondary fluid is injected into primary fluid on each reciprocation of said assembly when the first end of the cylinder is attached to a housing filled with primary fluid, secondary fluid is supplied at the inlet and the assembly is reciprocated in the cylinder 2. The apparatus of claim 1 wherein positioning means on the second end portion of the reciprocable assembly positions the valve means to close the secondary fluid inlet during a portion of the down stroke.

3. The apparatus of claim 2 wherein the cylinder is divided intermediate the first and second ends into an upper part and a lower part, the parts being removably clamped together in assembly and having means for sealingly engaging the outer rim of the rolling diaphragm to hold it in place.

4. The apparatus of claim 3 wherein the positioning means on the second end portion of the reciprocable assembly includes means for sealingly engaging an inner rim portion of the rolling diaphragm to move in concert with the reciprocable assembly.

5. The apparatus of claim 1 wherein the reciprocable assembly is separable in the middle portion and the internal passage means for transmitting secondary fluid from the secondary fluid inlet to the outlet includes a one-way flow valve.

6. A rolling diaphragm pump apparatus for supplying a predetermined quantity of secondary fluid to an outlet located in the primary fluid of a housing, comprising:

a cylinder having opposite first and second ends and a bore between the ends, the first end being adapted for connection to a housing having a primary fluid and a reciprocating motor, the second end being closed except for having a fluid inlet connectable to a source of secondary fluid;

a reciprocable assembly having an outlet in a first end portion and an inlet in an opposite second end portion and an internal passage means between said first and second end portions for transmitting secondary fluid from the inlet to the outlet, the reciprocable assembly being positioned for reciprocation in the bore with the second end portion having a valve means for opening and closing the secondary fluid inlet at said second end of the cylinder and selective positioning means which positions the valve means to close the secondary fluid inlet during a portion of the down stroke, including a lost motion coupling wherein one part of the second end portion moves relative to another part thereof during part of a reciprocating cycle; and a rolling diaphragm sealingly connecting the cylinder and reciprocable assembly to form a secondary fluid chamber in the bore below and movable with the reciprocable assembly between an up stroke away from the closed end of the cylinder and a down stroke towards the closed end of the cylinder, to draw secondary fluid into the volume below the diaphragm through the secondary fluid inlet during the up stroke and to compress the secondary fluid below the diaphragm after the valve means closes the secondary fluid inlet during the down stroke, to force secondary fluid into the inlet of the reciprocable assembly, through the internal passage and outlet whereby a predetermined quantity of secondary fluid is injected into primary fluid on each reciprocation of said assembly when the first end of the cylinder is attached to a housing filled with primary fluid, secondary fluid is supplied at the inlet and the assembly is reciprocated in the cylinder.

7. The apparatus of claim 6 wherein the lost motion coupling includes a pin in said one part and at least one cooperating slot in said another part.

8. The apparatus of claim 7 wherein said one part of the second end portion of the reciprocable assembly is an elongated hollow sleeve and said another part is a hollow shaft slidingly fitted into said hollow sleeve, the shaft having the pin and the sleeve having said at least one cooperating slot.

9. The apparatus of claim 8 wherein said shaft has a plurality of adjustment holes for said pins to establish the amount of downstroke remaining after the valve means closes the secondary fluid inlet during the down stroke.

10. The apparatus of claim 3 wherein the valve means is secured to said one part of the second end portion of the reciprocable assembly.

11. The apparatus of claim 10 wherein said valve means is biased toward a closed position by a spring means.

12. A rolling diaphragm pump apparatus for supplying a predetermined quantity of secondary fluid to an outlet located in the primary fluid of a housing comprising:

a cylinder having opposite first and second ends and a bore between the ends, the first end being adapted for connection to a housing having a primary fluid and a reciprocating motor, the second end being closed except for having a fluid inlet connectable to a source of secondary fluid, the cylinder being divided intermediate the first and second ends into an upper part and a lower part, the parts being removably clamped together in assembly and having means for sealingly engaging the outer rim of a rolling diaphragm to hold it in place;

a reciprocable assembly having an outlet in a first end portion and an inlet in an opposite second end portion and an internal passage means between said first and second end portions for transmitting secondary fluid from the inlet to the outlet, the reciprocable assembly being positioned for reciprocation in the bore with the second end portion having a valve means for opening and closing the secondary fluid inlet at said second end of the cylinder and positioning means to position the valve means to close the secondary fluid inlet during a portion of the down stroke, the positioning means on the second end portion of the reciprocable assembly includes means for sealingly engaging an inner rim portion of a rolling diaphragm to move in concert with the reciprocable assembly, the means for sealingly engaging the inner rim portion of the diaphragm comprises a clamping collar removably carried by the second end portion of the reciprocable assembly; and a rolling diaphragm sealingly connecting the cylinder and reciprocating assembly to form a secondary fluid chamber in the bore below and movable with the reciprocating assembly between an up stroke away from the closed end of the cylinder and a down stroke towards the closed end of the cylinder, to draw secondary fluid into the volume below the diaphragm through the second fluid inlet during the up stroke and to compress the secondary fluid below the diaphragm after the valve means closes the secondary fluid inlet during the down stroke, to force secondary fluid into the inlet of the reciprocable assembly through the internal passage and outlet whereby a predetermined quantity of secondary fluid is injected into primary fluid on each reciprocation of said assembly when the first end of the cylinder is attached to a housing filled with primary fluid, secondary fluid is supplied at the inlet and the assembly is reciprocated in the cylinder.

13. The apparatus of claim 12 wherein the clamping collar includes at least one annular seal in contact with the inner rim portion of the diaphragm.

14. The apparatus of claim 12 wherein the clamping collar includes an elongated portion surrounding the second end portion of the reciprocable assembly extending toward the valve means and serving as a guide member to center the reciprocable assembly in the bore during reciprocation.

15. The apparatus of claim 14 wherein the guide member is separate from said clamping collar.

16. The apparatus of claim 15 wherein between the elongated portion surrounding the second end portion of the reciprocable assembly and the bore of the lower part of the cylinder are a plurality of longitudinal channels to aid in fluid flow.

17. The apparatus of claim 15 wherein the elongated portion surrounding the second end of the reciprocable assembly includes radial ports in fluid communication with said longitudinal channels.

18. The apparatus of claim 12 wherein the first end portion of the reciprocable assembly includes connecting means for accommodating the stroke of the second end portion of the reciprocable assembly to a different stroke of a reciprocating motor when the first end portion of the reciprocable assembly is connected to said motor for reciprocation.

19. The apparatus of claim 18 wherein said connecting means includes a lost motion coupling wherein one part of the first end portion of the reciprocable assembly moves relative to another part thereof during part of a reciprocating cycle.

20. The apparatus of claim 19 wherein said one part of the first end portion of the reciprocable assembly is a stem having said secondary fluid outlet and said another part is a sleeve.

21. The apparatus of claim 20 wherein the lost motion coupling includes a pin in said sleeve and at least one cooperating slot in said stem.

22. A rolling diaphragm pump apparatus for supplying a predetermined quantity of secondary fluid to an outlet located in the primary fluid of a housing, comprising:
a cylinder having opposite first and second ends and a bore between the ends, the first end being adapted for connection to a housing having a primary fluid and a reciprocating motor, the second end being closed except for having a fluid inlet connectable to a source of secondary fluid;
a reciprocable assembly having an outlet in a first end portion and an inlet in an opposite second end portion and an internal passage means between said first and second end portions for transmitting secondary fluid from the inlet to the outlet, the reciprocable assembly being positioned for reciprocation in the bore with the second end portion having a valve means for opening and closing the secondary fluid inlet at said second end of the cylinder;
the reciprocable assembly being separable in the middle portion at a connection between a hollow sleeve of the first end portion and a hollow sleeve of the second end portion wherein the internal passage means communicates with the fluid inlet and outlet through both sleeves and the internal passage means for transmitting secondary fluid from the secondary fluid inlet to the outlet includes a one-way valve; and
a rolling diaphragm sealingly connecting the cylinder and reciprocating assembly to form a secondary fluid chamber in the bore below and movable with the reciprocating assembly between an up stroke away from the closed end of the cylinder and a down stroke towards the closed end of the cylinder, to draw secondary fluid into the volume below the diaphragm through the secondary fluid inlet during the up stroke and to compress the secondary fluid below the diaphragm after the valve means closes the secondary fluid inlet during the down stroke, to force secondary fluid into the inlet of the reciprocable assembly, through the internal passage and outlet whereby a predetermined quantity of secondary fluid is injected into primary fluid on each reciprocation of said assembly when the first end of the cylinder is attached to a housing filled with primary fluid, secondary fluid is supplied at the inlet and the assembly is reciprocated in the cylinder.

23. The apparatus of claim 22 wherein the hollow sleeve of the second end portion of the reciprocable assembly carries a selective positioning means for selectively positioning the valve means to close the secondary fluid inlet during a portion of the down stroke.

24. Apparatus for injecting a predetermined quantity of secondary fluid additive into a housing having a primary fluid and a reciprocating means, comprising:
an elongated cylinder having a first end adapted for attaching to the housing, a closed second end having a secondary fluid inlet and a bore therebetween;
a reciprocable assembly having an internal passageway and internal one-way valve, extending between one end portion of the assembly extending from the first end of the cylinder and an opposite end portion of the assembly in fluid communication with a secondary fluid pump chamber and having a means for closing the secondary fluid inlet;
a rolling diaphragm sealingly mounted between the cylinder and reciprocable assembly and defining a variable pump chamber on one side of the diaphragm surrounding said opposite end portion of the reciprocable assembly positioned in the second end of the elongated cylinder;
wherein reciprocation of the reciprocable assembly in a first direction opens the secondary fluid inlet closing means to draw secondary fluid into the secondary fluid pump chamber and reciprocation in a second opposite direction compresses secondary fluid in said chamber after the secondary fluid inlet is closed by the closing means, whereupon further reciprocation of said assembly forces secondary fluid through the internal passageway and one-way valve to an outlet at said one end portion of the assembly whereby a predetermined quantity of secondary fluid is supplied to the primary fluid stream in the housing for each reciprocation when the first end of the cylinder is attached thereto and the reciprocable assembly is reciprocated.

25. Apparatus for injecting a predetermined quantity of secondary fluid additive into a housing having a primary fluid and a reciprocating means, comprising:
an elongated cylinder having a first end adapted for attaching to the housing, a closed second end having a secondary fluid inlet and a bore therebetween;

a reciprocable assembly having an internal passageway and internal one-way valve, extending between one end portion of the assembly extending from the first end of the cylinder and an opposite end portion of the assembly in fluid communication with a secondary fluid pump chamber and having a means for closing the secondary fluid inlet, wherein the opposite end portion of the assembly carries selective positioning means to selectively close the means for closing the secondary fluid inlet to adjust the predetermined amount of secondary fluid injected at each reciprocation of the assembly;

a rolling diaphragm sealingly mounted between the cylinder and reciprocable assembly and defining a variable pump chamber on one side of the diaphragm surrounding said opposite end portion of the reciprocable assembly positioned in the second end of the elongated cylinder;

wherein reciprocation of the reciprocable assembly in a first direction opens the secondary fluid inlet closing means to draw secondary fluid into the secondary fluid pump chamber and reciprocation in a second opposite direction compresses secondary fluid in said chamber after the secondary fluid inlet is closed by the closing means, whereupon further reciprocation of said assembly forces secondary fluid through the internal passageway and one-way valve to an outlet at said one end portion of the assembly whereby a predetermined quantity of secondary fluid is supplied to the primary fluid stream in the housing for each reciprocation when the first end of the cylinder is attached thereto and the reciprocable assembly is reciprocated.

26. The apparatus of claim 25 wherein the reciprocable assembly includes guide means for centering the reciprocation in the bore.

27. Apparatus for injecting a predetermined quantity of secondary fluid additive into a primary fluid stream which is contained in a housing having a means for reciprocation, comprising:

a housing having primary fluid stream connections and a reciprocating motor means in the housing drivable by the primary fluid energy;

an elongated cylinder having a first open end attached to the housing and having a bore formed therein;

elongated tubular shaft means reciprocally disposed in said bore having a means for connection to said means for reciprocating in the housing and reciprocable between an intake stroke and a discharge stroke;

a pump diaphragm means mounted in the cylinder between the cylinder and the tubular shaft means, forming a secondary fluid pumping chamber defined in part by the bore of the elongated cylinder and a head means closing a second end portion of said cylinder;

a head means for closing the second end portion of the cylinder, said head means having secondary fluid inlet passageway leading to a source of secondary fluid in communication with said secondary fluid pumping chamber;

said elongated tubular shaft means having a passageway in fluid communication between said secondary fluid pumping chamber and the primary fluid stream when the first end of the elongated cylinder is attached to said housing having the primary fluid;

one way valve means in said passageway which operates to allow fluid flow from said secondary fluid pumping chamber through said tubular shaft means only during a discharge stroke;

valve means operated by said tubular shaft means for closing the secondary fluid inlet passageway during a discharge stroke and opening said passageway to admit secondary fluid during an intake stroke;

wherein reciprocation of the elongated tubular shaft means on an intake stroke will draw secondary fluid into the pumping chamber and on a discharge stroke will pump secondary fluid out of the pumping chamber through the passageway of the tubular shaft means into the housing to mix with primary fluid therein.

28. The apparatus of claim 27 wherein the opposite end portion of the assembly carries selective positioning means to selectively close the means for closing the secondary fluid inlet to adjust the predetermined amount of secondary fluid injected at each reciprocation of the assembly.

29. The apparatus of claim 28 wherein the reciprocable assembly includes guide means for centering the reciprocation in the bore.

* * * * *

UNITED STATES PATENT AND TRADEMARK OFFICE
CERTIFICATE OF CORRECTION

PATENT NO. : 5,184,943
DATED : February 9, 1993
INVENTOR(S) : Frank Walton

It is certified that error appears in the above-identified patent and that said Letters Patent is hereby corrected as shown below:

On title page, item [56] "References Cited", change date of Pat. 2,278,395 from "1941" to --1942--.

In column 10, line 8, delete "3" and add --6--.

In column 10, line 57, delete "second" and add --secondary--.

In column 14, line 6, delete "reciprocating" and add --reciprocation--.

Signed and Sealed this

Twelfth Day of April, 1994

Attest:

BRUCE LEHMAN

Attesting Officer

Commissioner of Patents and Trademarks